US010184083B2

(12) United States Patent
Tsoi

(10) Patent No.: US 10,184,083 B2
(45) Date of Patent: Jan. 22, 2019

(54) METHOD AND APPARATUS FOR REFINING OIL FROM TIRE

(71) Applicant: GLOBAL VELOCITY HOLDING LIMITED, Tortola, Virgin Islands (GB)

(72) Inventor: Man Po Tsoi, Hong Kong (CN)

(73) Assignee: GLOBAL VELOCITY HOLDING LIMITED, Tortola (VG)

( * ) Notice: Subject to any disclaimer, the term of this patent is extended or adjusted under 35 U.S.C. 154(b) by 599 days.

(21) Appl. No.: 14/740,931

(22) Filed: Jun. 16, 2015

(65) Prior Publication Data
US 2015/0275093 A1 Oct. 1, 2015

Related U.S. Application Data

(63) Continuation of application No. PCT/CN2013/075720, filed on May 16, 2013.

(30) Foreign Application Priority Data

Dec. 17, 2012 (CN) .......................... 2012 1 0547157
Apr. 7, 2013 (CN) .......................... 2013 1 0117410

(51) Int. Cl.
C10B 53/07 (2006.01)
C10B 7/10 (2006.01)
(Continued)

(52) U.S. Cl.
CPC ................ C10B 53/07 (2013.01); C10B 7/10 (2013.01); C10B 23/00 (2013.01); C10B 27/02 (2013.01);
(Continued)

(58) Field of Classification Search
CPC ..................................... C10B 47/26
See application file for complete search history.

(56) References Cited

U.S. PATENT DOCUMENTS 4,250,158 A 2/1981 Solbakken et al.

FOREIGN PATENT DOCUMENTS

CN 2666914 12/2004
CN 2666914 Y * 12/2004 .......... Y02W 30/702
(Continued)

OTHER PUBLICATIONS

Machine Translation CN202576344, obtained from Espacenet Feb. 20, 2018 (Year: 2011).*

(Continued)

Primary Examiner — Bobby Ramdhanie
Assistant Examiner — Denise R Anderson
(74) Attorney, Agent, or Firm — Hamre, Schumann, Mueller & Larson, P.C.

(57) ABSTRACT

Disclosed is a method and apparatus for refining oil from tire, the apparatus includes a box body, an upper transmission channel, an upper transmission device, a lower transmission channel, a lower transmission device, a molten salt storage container, and a heat-conduction oil storage container, where the upper transmission channel is located above the lower transmission channel, a molten salt liquid channel and a heat-conduction oil channel are respectively disposed on an outside wall of the upper transmission channel and that of the lower transmission channel, the upper transmission channel includes an upper transmission channel inlet and an upper transmission channel outlet, and the heated molten salt liquid passes through the molten salt liquid channel and then flows back to the molten salt storage container; and the heated heat-conduction oil passes through the heat-conduction oil channel and then flows back to the heat-conduction oil storage container.

16 Claims, 6 Drawing Sheets

(51) Int. Cl.
*C10B 23/00* (2006.01)
*C10B 47/26* (2006.01)
*C10B 27/02* (2006.01)
*C10G 1/10* (2006.01)
*C10G 1/00* (2006.01)
*C10B 47/44* (2006.01)

(52) U.S. Cl.
CPC .............. *C10B 47/26* (2013.01); *C10B 47/44* (2013.01); *C10G 1/002* (2013.01); *C10G 1/10* (2013.01); *Y02P 20/143* (2015.11)

(56) References Cited

FOREIGN PATENT DOCUMENTS

| | | | |
|---|---|---|---|
| CN | 101352721 | | 1/2009 |
| CN | 102140358 | | 8/2011 |
| CN | 201952394 | | 8/2011 |
| CN | 202016986 | | 10/2011 |
| CN | 202016986 U | * | 10/2011 ............ Y02P 20/123 |
| CN | 102260515 | | 11/2011 |
| CN | 202107667 | | 1/2012 |
| CN | 202576344 | | 12/2012 |
| CN | 202576344 U | * | 12/2012 |
| CN | 103013553 | | 4/2013 |
| CN | 203295438 | | 11/2013 |
| EP | 0 747 463 | | 12/1996 |
| EP | 0890629 | | 1/1999 |
| JP | 2000053975 | | 2/2000 |

OTHER PUBLICATIONS

International Search Report issued in the corresponding International Application No. PCT/CN2013/075720, dated Sep. 19, 2013, 4 pages.
Chinese Office Action issued in the corresponding Chinese Application No. 201310117410.X, dated Jul. 16, 2014, 5 pages.
European Search Report for EP Application No. 13865272.2 dated Aug. 2, 2016, 8 pages.
Xie, Gang, The Theory and Application of Molten Salt. Beijing, China, Aug. 1998, p. 1. English translation of relevant portion included, 2 pages.
Second Office Action issued in corresponding Chinese Application No. 201310117410.X, dated Nov. 21, 2014. Chinese only, 9 pages.

* cited by examiner

METHOD AND APPARATUS FOR REFINING OIL FROM TIRE

CROSS REFERENCE TO RELATED APPLICATION

This application is a continuation application of PCT/CN2013/075720, filed on May 16, 2013. The contents of PCT/CN2013/075720 are all hereby incorporated by reference.

TECHNICAL FIELD

The present application relates to a method and apparatus for refining oil from tire.

BACKGROUND

Currently, a refining oil container of an apparatus for refining oil from waste tire is generally heated by burning fuel oil. Since the temperature of a flame generated by burning fuel oil, coal and the like is difficult to control, the generated high temperature tends to cause the tire to crack and produce fuel gas, so as to cause the produced oil to deteriorate. Therefore, not only the output rate and quality of oil are low, but also the fuel combustion causes great pollution to the environment.

SUMMARY

In order to solve the above technical problems, the embodiments of the present application provides an apparatus and method for refining oil from tire, so as to improve the yield rate of refining oil from tire and the quality of oil, and reduce environmental pollution.

An apparatus for refining oil from tire, comprising a box body, an upper transmission channel, an upper transmission device, a lower transmission channel, a lower transmission device, a molten salt storage container, and a heat-conduction oil storage container, where the upper transmission channel is located above the lower transmission channel; a molten salt liquid channel and a heat-conduction oil channel are respectively disposed on an outside wall of the upper transmission channel and that of the lower transmission channel; the upper transmission channel comprises an upper transmission channel inlet and an upper transmission channel outlet; the lower transmission channel comprises a lower transmission channel inlet and a lower transmission channel outlet; the upper transmission channel outlet is connected to the lower transmission channel inlet; the upper transmission device is configured to transmit an object from the upper transmission channel inlet to the upper transmission channel outlet; the lower transmission device is configured to transmit an object from the lower transmission channel inlet to the lower transmission channel outlet; the molten salt storage container is configured to store heated molten salt liquid, where the heated molten salt liquid passes through the molten salt liquid channel and then flows back to the molten salt storage container; the heat-conduction oil storage container is configured to store heated heat-conduction oil, where the heated heat-conduction oil passes through the heat-conduction oil channel and then flows back to the heat-conduction oil storage container; and the upper transmission channel, the upper transmission device, the lower transmission channel, the lower transmission device, the molten salt liquid channel and the heat-conduction oil channel are disposed inside the box body.

In a preferred solution, the upper transmission channel and the lower transmission channel are both a U-shaped trough with an opening upward, and the molten salt liquid channel and the heat-conduction oil channel both have a U-shaped cross-section.

In a preferred solution, the top of the box body is provided with an oil-gas outlet and a feeding inlet protruding from the box top, a channel of the feeding inlet is provided with a first valve and a second valve, and the first valve is located above the second valve.

In a preferred solution, the apparatus for refining oil from tire further comprises a condensing gas container, a gas container, and a refining oil container, where the refining oil container and the condensing gas container are respectively located at a lower position and a higher position, the condensing gas container comprises a condensing gas container inlet, an uncondensed gas outlet and a refining oil outlet respectively disposed at an upper part, a middle part and a lower part of the condensing gas container, the gas container comprises a gas container inlet and a gas container outlet, the box body further comprises a gas inlet of box body disposed at the bottom thereof, the oil-gas outlet is connected to the condensing gas container inlet, the refining oil outlet is connected to the refining oil container, the uncondensed gas outlet is connected to the gas container inlet, and the gas container outlet is connected to the gas inlet of box body.

In a preferred solution, the upper transmission channel and the lower transmission channel are cylinder-shaped.

In a preferred solution, a side wall of the upper transmission channel and that of the lower transmission channel are each provided with a gas outlet port.

In a preferred solution, the molten salt liquid channel in the box body is inclined downward, that is, the height of the molten salt liquid channel is gradually reduced, thereby facilitating molten salt liquid to flow out from the bottom.

In a preferred solution, the apparatus for refining oil from tire further comprises a holder, where the upper transmission channel, the upper transmission device, the lower transmission channel, the lower transmission device, the molten salt liquid channel and the heat-conduction oil channel are fixed on the holder, and the holder is provided with a wheel at the bottom thereof.

The embodiments of the present application further provides a method for refining oil from tire utilizing the apparatus for refining oil from tire, comprising the following steps:

heat-conduction oil cycling: heating heat-conduction oil in the heat-conduction oil storage container, and driving the heat-conduction oil that has been heated to pass through the heat-conduction oil channel and then flow back to the heat-conduction oil storage container;

molten salt liquid cycling: after setting time for the heat-conduction oil cycling, driving molten salt liquid in the molten salt storage container to pass through the molten salt liquid channel and then flow back to the molten salt storage container; and transmitting tire block in the upper transmission channel by the upper transmission device from the upper transmission channel inlet to the upper transmission channel outlet, and transmitting tire block in the lower transmission channel by the lower transmission device from the lower transmission channel inlet to the lower transmission channel outlet.

In a preferred solution, the method utilizing the apparatus for refining oil from tire further comprises the following steps:

closing the second valve and opening the first valve, so as to transmit the tire block into the feeding inlet; and closing the first valve and opening the second valve, so that the tire block enters into the box body.

In a preferred solution, the method utilizing the apparatus for refining oil from tire further comprises the following step:

pumping gas inside the gas container to the gas inlet of box body.

In a preferred solution, the method further comprises the following step:

extracting gas inside the box body to the condensing gas container, where the inner space of the box body is under a vacuum condition;

the temperature of molten salt liquid in the molten salt liquid channel is 200° C. to 400° C., and the temperature of heat-conduction oil in the heat-conduction oil channel is 100° C. to 250° C.

The embodiments of the present application may have the following beneficial effects: the tire is heated and pyrolyzed by the heating source generated by the molten salt liquid channels of at least two transmission channels, so that the quality and yield rate of refining oil are improved, without any gas pollution generated (comprising fuel gas, tail gas and the like), and the apparatus is more advanced than the existing apparatus for refining oil from tire; and in addition, the heat-conduction oil channel is used for heating the molten salt liquid channel, so as to avoid the solidification of the molten salt liquid, so to avoid blocking of the molten salt liquid channel and even the damage to the whole transmission channel.

DETAILED DESCRIPTION

Figure 1:
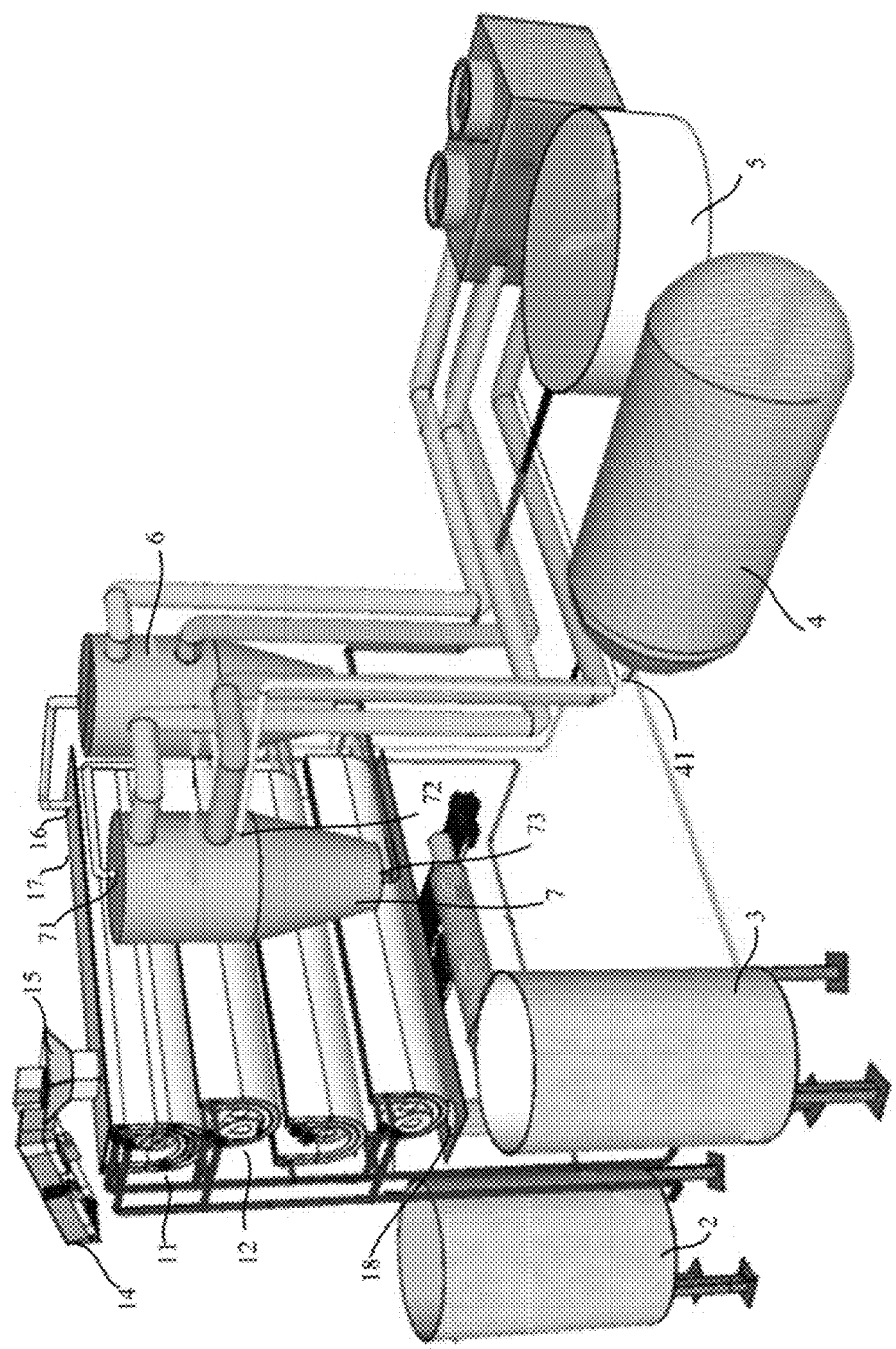
FIG. 1 is a schematic diagram of an apparatus for refining oil from tire according to an embodiment of the present application.

The following further describes specific embodiments of the present application in detail with reference to the accompanying drawings.

As shown in FIG. 1 to FIG. 8, an apparatus for refining oil from tire of an embodiment, comprising a box body 1, an upper transmission channel 11, an upper transmission device 114, a lower transmission channel 12, a lower transmission device, a molten salt storage container 3, and a heat-conduction oil storage container 2, where the upper transmission channel 11 is located above the lower transmission channel 12; a molten salt liquid channel 112 and a heat-conduction oil channel 111 are disposed on an outside wall of the upper transmission channel 11 in sequence; and similar to the structure of the upper transmission channel 11, a molten salt liquid channel 122 and a heat-conduction oil channel 121 are disposed on an outside wall of the lower transmission channel 12 in sequence; the upper transmission channel 11 comprises an upper transmission channel inlet 115 and an upper transmission channel outlet 116; the lower transmission channel 12 comprises a lower transmission channel inlet 126 and a lower transmission channel outlet 125; the upper transmission channel outlet 116 is connected to the lower transmission channel inlet 126; the upper transmission device 114 is configured to transmit an object (for example, a tire block obtained by cutting a waste tire, or a tire block that has been heated and pyrolyzed to a certain degree) from the upper transmission channel inlet 115 to the upper transmission channel outlet 116, where the object may fall to the lower transmission channel inlet 126 under gravity, and the lower transmission device transmits the object from the lower transmission channel inlet 126 to the lower transmission channel outlet 125; the molten salt storage container 3 is configured to heat the molten salt or molten salt liquid, where the heated molten salt liquid passes through the molten salt liquid channel 112 and then flows back to the molten salt storage container 3; the heat-conduction oil storage container 2 is configured to heat the heat-conduction oil, where the heated heat-conduction oil passes through the heat-conduction oil channel 111 and then flows back to the heat-conduction oil storage container 2; and the upper transmission channel 11, the upper transmission device 114, the lower transmission channel 12, the lower transmission device, the molten salt liquid channel 112, and the heat-conduction oil channel 111 are disposed inside the box body 1.

A plurality of transmission channels may be disposed from top to bottom within the box body 1, depending on specific production capacity (for example, 4 transmission channels may be disposed as shown in FIG. 1). In two adjacent transmission channels, an outlet of an upper transmission channel is connected to an inlet of a lower transmission channel, so that a tire block or another material in the upper transmission channel may fall into the lower transmission channel under gravity. Through arranging a plurality of transmission channels, the tire block has been fully heated and pyrolyzed when reaching the lowest transmission channel, so that the rate of refining oil from tire blocks is improved, and the tire blocks can be continually transmitted to the box body 1 for refining oil, thereby achieving continuous production, fully utilizing vertical space and saving a floor area of the apparatus.

Particularly, when a transmission channel (the upper transmission channel 11, the lower transmission channel 12, or the like) is a U-shaped trough with an opening upward, and the molten salt liquid channel 112 and the heat-conduction oil channel 111 both have a U-shaped cross-section, a tire block is heated and pyrolyzed during movement, and the generated gas can timely and easily volatilize to reach the top of the box body 1. In addition, the probability for a tire prone to caking after pyrolysis to adhere to an inner wall of a transmission channel is lowered, and the resistance of the transmission device is reduced (for example, in a cylinder-shaped transmission channel, a waste residue of the tire after pyrolysis easily adheres to the inner wall of the transmission channel).

Figure 2:
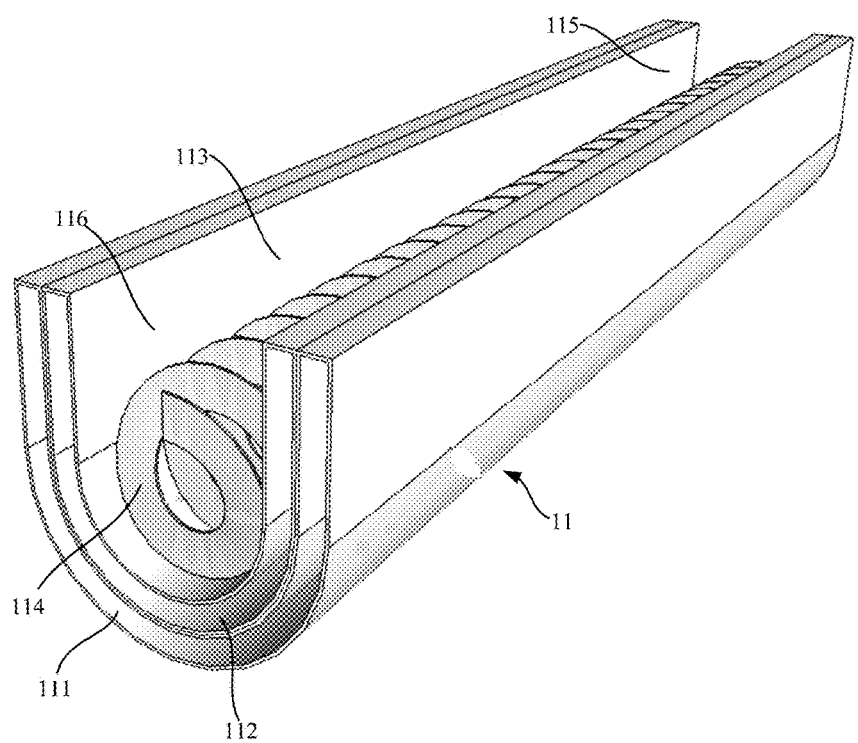
FIG. 2 is a schematic diagram of a transmission channel of an apparatus for refining oil from tire according to an embodiment.
Figure 3:
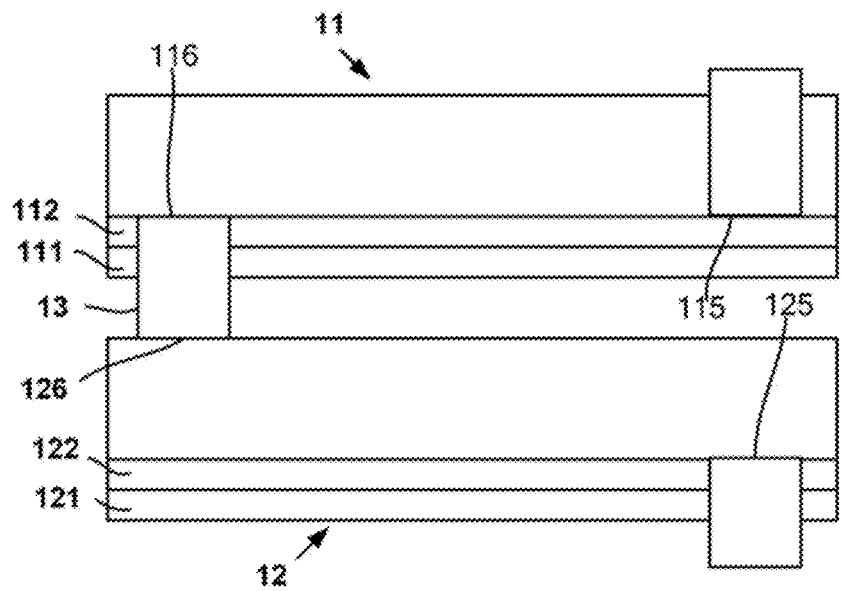
FIG. 3 is a schematic sectional diagram of the adjacent upper and lower transmission channels of an apparatus for refining oil from tire according to an embodiment.
Figure 4:
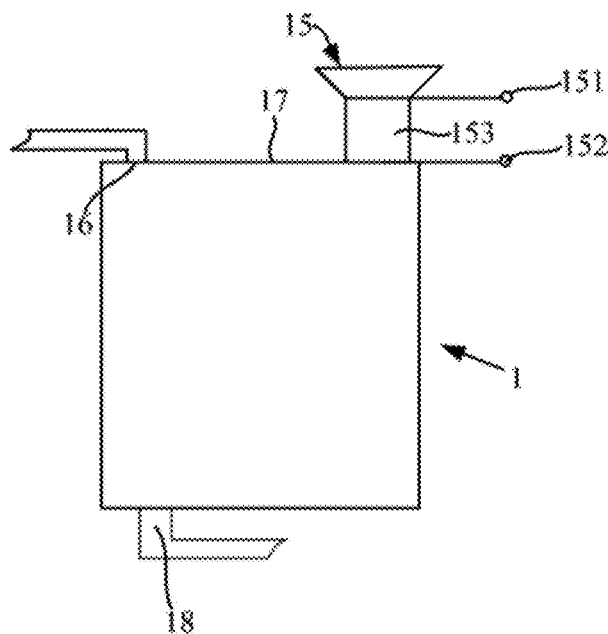
FIG. 4 is a schematic partial diagram of a box body of an apparatus for refining oil from tire according to an embodiment.
Figure 6:
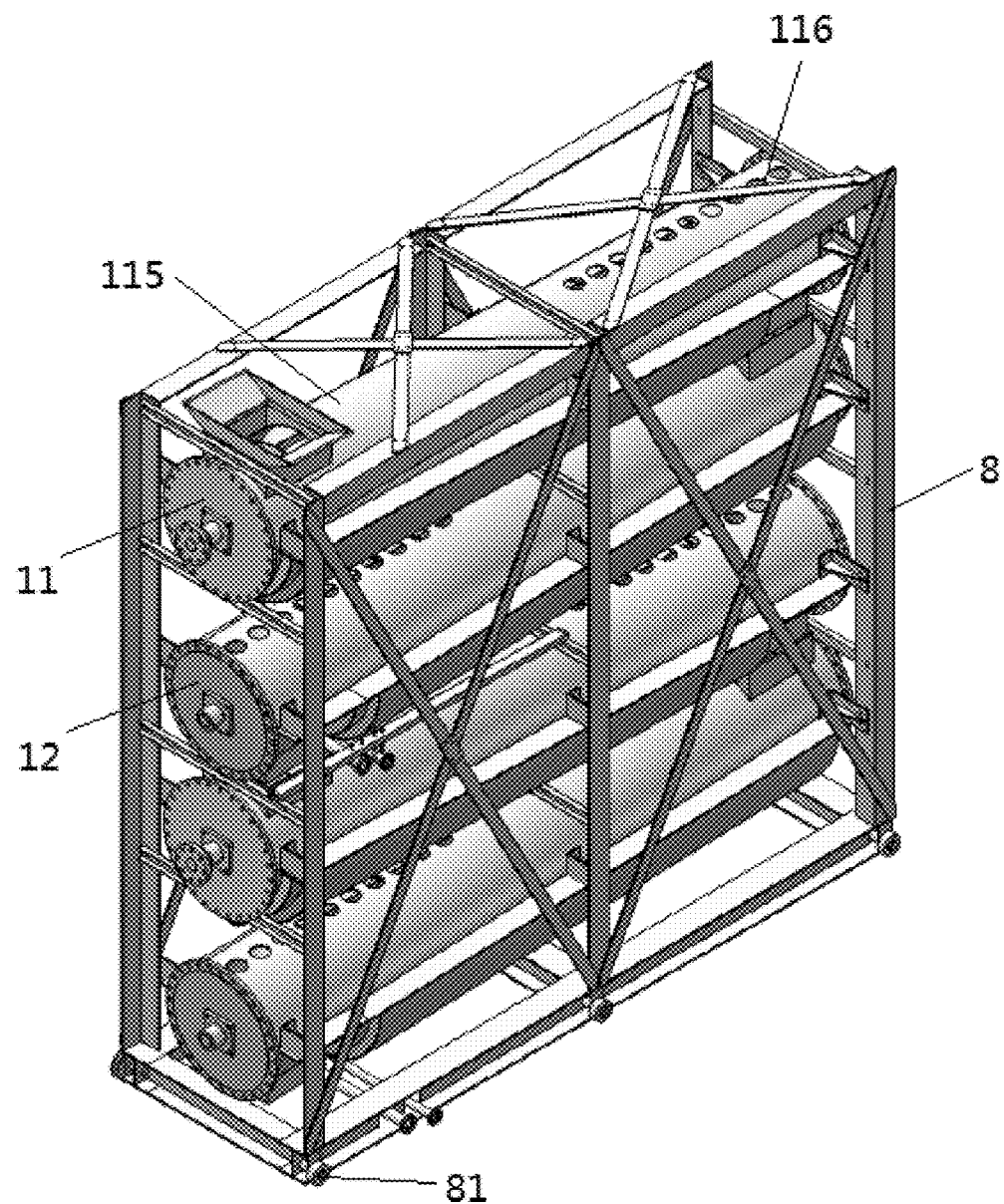
FIG. 6 is a schematic diagram of a transmission channel with a holder of an apparatus for refining oil from tire according to an embodiment.
Figure 7:
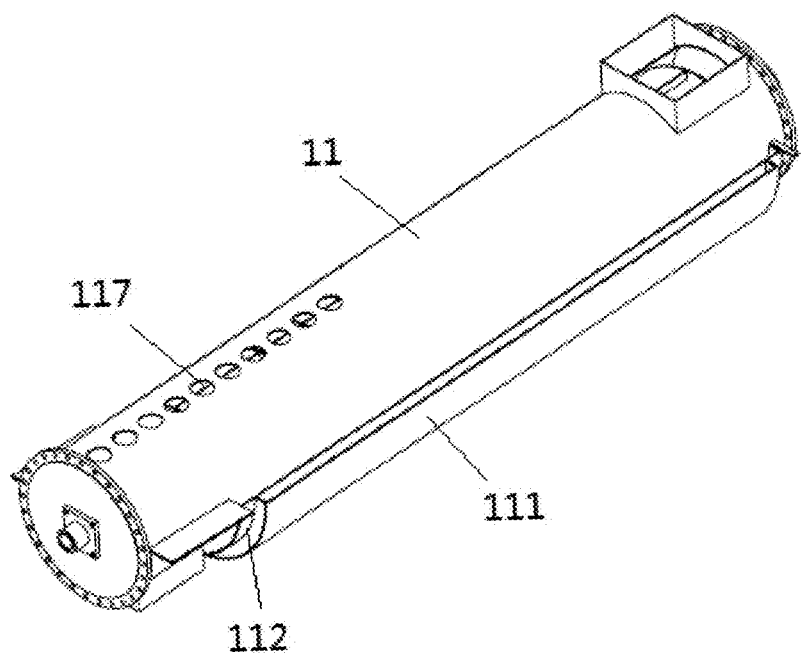
FIG. 7 is a three-dimensional schematic diagram of a single transmission channel of FIG. 6.
Figure 8:
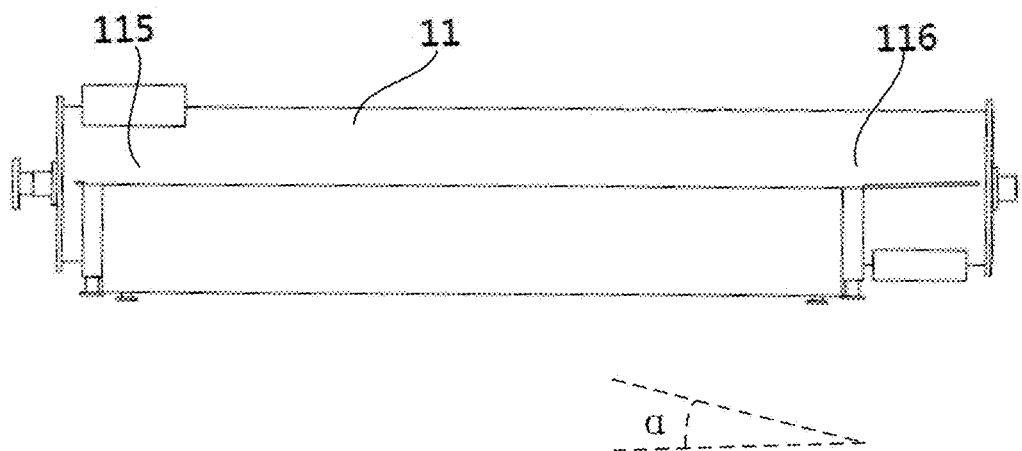
FIG. 8 is a schematic side view of FIG. 7.

Certainly, a transmission channel may also be cylinder-shaped, as shown in FIG. 6 to FIG. 8, where a cylinder-shaped side wall is provided with a gas outlet port 117, facilitating gas generated by pyrolysis to pass through the gas outlet 117 and overflow from the transmission channel 11, then enter the space within the box body 1 and finally overflow from the oil-gas outlet 16. During the procedure of pyrolysis, the temperature of the transmission channel 11 is very high, and so a side wall of a U-shaped transmission channel may return to a shape of flat plate, but a cylinder-shaped transmission channel can avoid occurrence of such a problem. The transmission device 114 can adopt a screw-type driving device as shown in FIG. 2, and can also adopt another driving device such as a driving belt.

A box top 17 of the cabinet body 1 is provided with an oil-gas outlet 16, and a feeding inlet 15 protruding from the box top 17. A channel 153 of the feeding inlet 15 is provided with a first valve 151 and a second valve 152. The first valve 151 is located above the second valve 152. Below the feeding inlet 15 is a transmission channel.

The apparatus for refining oil further comprises a condensing gas container 7, a gas container 4, and a refining oil container 5, where the refining oil container 5 and the condensing gas container 7 are respectively located at a lower position and a higher position, the condensing gas container 7 comprises a condensing gas container inlet 71, an uncondensed gas outlet 72 and a refining oil outlet 73 respectively disposed at an upper part, a middle part and a lower part of the condensing gas container 7, the gas container 4 comprises a gas container inlet 41 and a gas container outlet, the box body 1 further comprises a gas inlet of box body disposed at the bottom thereof, the oil-gas outlet 16 is connected to the condensing gas container inlet 71, the refining oil outlet 73 is connected to the refining oil container 5, the uncondensed gas outlet 72 is connected to the gas container inlet, and the gas container outlet is connected to the gas inlet of box body. Certainly, the apparatus may further comprise a preceding condensing gas container 6, having the same structure as the condensing gas container 7, and an uncondensed gas outlet of the preceding condensing gas container 6 is connected to the condensing gas container inlet 71 of the condensing gas container 7.

A method for refining oil from tire according to an embodiment utilizing the apparatus for refining oil from tire of the previous embodiment comprises the following steps:

heat-conduction oil cycling: heating heat-conduction oil in the heat-conduction oil storage container 2, and driving the heat-conduction oil that has been heated to pass through the heat-conduction oil channel (comprising the heat-conduction oil channel 111) and then flow back to the heat-conduction oil storage container 2, where heat-conduction oil stored in the heat-conduction oil storage container 2 can be heated by using an electrical heater disposed in the heat-conduction oil storage container 2, or by using another heating method, and a pump for driving the heat-conduction oil to flow can be installed at any position of the cycling channel, and certainly, the pump is preferably installed outside the box body 1 and the heat-conduction oil storage container 2; and molten salt liquid cycling: after setting time for the heat-conduction oil cycling (correspondingly, the molten salt liquid channel has reached a corresponding temperature), driving the molten salt liquid in the molten salt storage container to pass through the molten salt liquid channel (the molten salt liquid channel 112) and then flow back to the molten salt storage container 3, which is because if the molten salt liquid is driven to pass through the molten salt liquid channel when the transmission channel has not been fully preheated, the molten salt liquid is easily solidified at a low temperature and then blocks the molten salt liquid channel, and in addition, if a heating source of the molten salt liquid abruptly fails for some reason and cannot provide heating, at this time due to heating by the heat-conduction oil channel, the molten salt liquid in the molten salt liquid channel will not be solidified to block the molten salt liquid channel (or even cause the whole transmission channel to be scrapped); the molten salt storage container 3 can also be provided inside with a heater for heating molten salt or molten salt liquid, and a pump for driving the molten salt liquid to flow can be installed at any position of the molten salt liquid cycling channel, and certainly, the pump is preferably installed outside the box body 1 and the molten salt storage container 3.

When the molten salt liquid has already been flowing in all the molten salt liquid channels, a tire block can be transmitted by a feeding belt 14 into a feeding inlet 15 of the box body 1. Then, the second valve 152 is closed and the first valve 151 is opened, so that the tire block enters the channel 153 of the feeding inlet 15, and then the first valve 151 is closed and the second valve 152 is opened, so that the tire block enters a transmission channel inside the box body 1, and is driven by the transmission channel to move, thereby not only preventing gas in the box body 1 from flowing out and consequently causing environmental pollution, but also avoiding a risk generated by the air carried with the tyre block flowing into the high-temperature box body 1. For example, a tire block falls to an upper transmission channel inlet 115, and is heated (by a relatively stable heating source released from a molten salt liquid channel 112) and gradually pyrolyzed during the process of being transmitted to an upper transmission channel outlet 116. Generated gas passes a trough opening 113 to reach the top of the box body 1, and enters the condensing gas container 7 from the oil-gas outlet 16. A tire block that has not been fully pyrolyzed falls from the upper transmission channel outlet 116 to a lower transmission channel inlet 126 through a channel 13, and is further transmitted to the lower transmission channel outlet 125. During this process, the tire block is further heated and pyrolyzed, until being finally transmitted to a tire residue outlet 18 of the box body 1.

Prior to transmitting a tire block into the box body 1, the space of the cabinet body 1 is vacuumized, which is not only favorable to collecting gas generated by pyrolysis, but also can avoid a potential risk caused by combustion of the gas when contacting with the air at a high temperature.

The gas generated by pyrolysis enters the condensing gas container 7, where a portion of the gas is condensed to form oil at a low temperature, and flows from the refining oil outlet 73 to the refining oil container 5; and a portion of uncondensed gas (comprising a portion of macromolecular gas that can be further pyrolyzed, i.e. a gas molecule with high carbon content; and micro-molecular gas that cannot be further pyrolyzed) enters the gas container 4. Gas inside the gas container 4 is pumped to the gas inlet of box body at the bottom of the box body 1, reheated and further pyrolyzed, and then flows to the oil-gas outlet 16.

As shown in FIG. 8, for the upper transmission channel 11, the molten salt liquid channel 112 preferably has an included angle α with a horizontal plane, so that when a heating source of molten salt liquid abruptly fails and cannot provide heating, the molten salt liquid can relatively easily flow out from a lower end, in the figure, the molten salt liquid flows from one end, the upper transmission channel inlet 115 to another end, the upper transmission channel outlet 116. As shown in FIG. 6, when the entire apparatus for refining oil from tire has a plurality of transmission channels, interconnected molten salt liquid channels are inclined downward from top to bottom in sequence (that is, the height of the molten salt liquid channels is gradually reduced), so that when there is no force to drive the molten salt liquid to flow, the molten salt liquid can more easily flow from the highest molten salt liquid channel to the lowest molten salt liquid channel, and finally flow out of the molten salt liquid channel. Certainly, even if the molten salt liquid channel 112 is located on a horizontal plane, the molten salt liquid can also flow out of the lowest molten salt liquid channel. However, residual molten salt liquid may still exist in some molten salt liquid channels, leading to a risk of damage to the molten salt liquid channel after condensation of the molten salt liquid.

As shown in FIG. 6, one or more transmission channels can be fixed on a holder 8, where a wheel 81 may be disposed at the bottom of the holder 8. During assembling, the transmission channels that have been fixed on the holder 8 are pushed into the box body 1, and when maintenance is needed, the holder 8 is pushed out so that the transmission channels can be repaired or maintained. In such a manner, the transmission channels can be maintained very conveniently without entering the box body 1.

Figure 5:
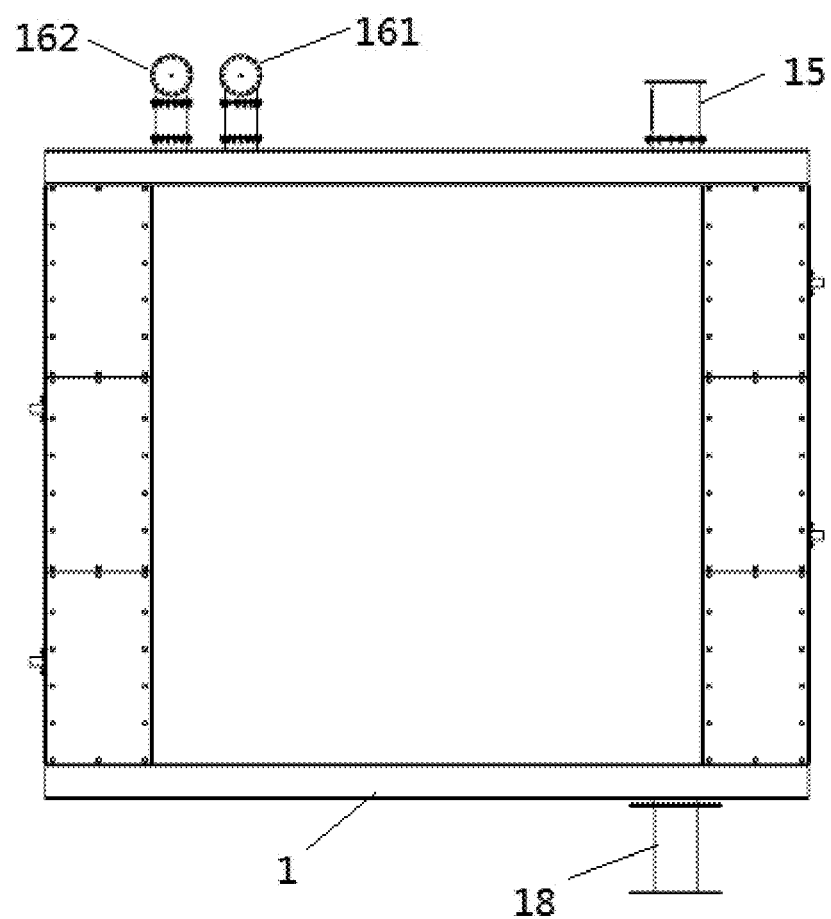
FIG. 5 is a schematic diagram of a box body of an apparatus for refining oil from tire according to an embodiment.

As shown in FIG. 5, the top of the box body 1 may be provided with at least two oil-gas outlets, oil-gas outlet 161 and oil-gas outlet 162, where if a pipeline and a container between the oil-gas outlet 161 and the refining oil container 5 needs to be maintained or repaired, the oil-gas outlet 161 may be enclosed so as to vent gas from the oil-gas outlet 162, thereby preventing gas pyrolysis in the box body 1 from being interrupted, and ensuring continuous production of the gas. Certainly, each oil-gas outlet needs to be provided with a corresponding condensing gas container 7, a refining oil container 5, and the like.

The temperature of molten salt liquid in the molten salt liquid channel is 200° C. to 400° C. The tire starts to be pyrolyzed at about 130° C. It has been proved through tests that, a tire is pyrolyzed most suitably at 315° C., and the temperature of heat-conduction oil in the heat-conduction oil channel is 100° C. to 250° C.

What is claimed is:
1. An apparatus, comprising:
a box body,
an upper transmission channel,
an upper transmission device,
a lower transmission channel,
a lower transmission device,
a molten salt storage container, and
a heat-conduction oil storage container,
wherein the upper transmission channel is located above the lower transmission channel;
a molten salt liquid channel and a heat-conduction oil channel are respectively disposed on an outside wall of the upper transmission channel and on an outside wall of the lower transmission channel;
the upper transmission channel comprises an upper transmission channel inlet and an upper transmission channel outlet;
the lower transmission channel comprises a lower transmission channel inlet and a lower transmission channel outlet;
the upper transmission channel outlet is connected to the lower transmission channel inlet;
the upper transmission device is configured to transmit an object from the upper transmission channel inlet to the upper transmission channel outlet;
the lower transmission device is configured to transmit the object from the lower transmission channel inlet to the lower transmission channel outlet;
the molten salt storage container is configured to store heated molten salt liquid, wherein the heated molten salt liquid passes through the molten salt liquid channel of the upper transmission channel and the molten salt liquid channel of the lower transmission channel and then flows back to the molten salt storage container;
the heat-conduction oil storage container is configured to store heated heat-conduction oil, wherein the heated heat-conduction oil passes through the heat-conduction oil channel of the upper transmission channel and the heat-conduction oil channel of the lower transmission channel and then flows back to the heat-conduction oil storage container; and
the upper transmission channel, the upper transmission device, the lower transmission channel, the lower transmission device, the molten salt liquid channel of the upper transmission channel, the molten salt liquid channel of the lower transmission channel, the heat-conduction oil channel of the upper transmission channel, and the heat-conduction oil channel of the lower transmission channel are disposed inside the box body.

2. The apparatus according to claim 1,
wherein the upper transmission channel and the lower transmission channel are both a U-shaped trough with an opening upward,
the molten salt liquid channel of the upper transmission channel and/or the molten salt liquid channel of the lower transmission channel have/has a U-shaped cross-section, and
the heat-conduction oil channel of the upper transmission channel and/or the heat-conduction oil channel of the lower transmission channel have/has a U-shaped cross-section.

3. The apparatus according to claim 1, wherein the top of the box body is provided with an oil-gas outlet and a feeding inlet protruding from the box top, a channel of the feeding inlet is provided with a first valve and a second valve, and the first valve is located above the second valve.

4. The apparatus according to claim 3, further comprising:
a condensing gas container,
a gas container, and
a refining oil container,
wherein the refining oil container and the condensing gas container are respectively located at a lower position and a higher position,
the condensing gas container comprises a condensing gas container inlet, an uncondensed gas outlet and a refining oil outlet respectively disposed at an upper part, a middle part and a lower part of the condensing gas container,
the gas container comprises a gas container inlet,
the oil-gas outlet is connected to the condensing gas container inlet,
the refining oil outlet is connected to the refining oil container, and
the uncondensed gas outlet is connected to the gas container inlet.

5. The apparatus according to claim 1, wherein the upper transmission channel and the lower transmission channel are cylinder-shaped.

6. The apparatus according to claim 5, wherein a side wall of the upper transmission channel and a side wall of the lower transmission channel are each provided with a gas outlet port.

7. The apparatus according to claim 1, wherein the molten salt liquid channel of the upper transmission channel and/or the molten salt liquid channel of the lower transmission channel in the box body are/is inclined downward.

8. The apparatus according to claim 1, further comprising a holder,
wherein the upper transmission channel, the upper transmission device, the lower transmission channel, the lower transmission device, the molten salt liquid channel of the upper transmission channel and/or the molten salt liquid channel of the lower transmission channel, and the heat-conduction oil channel of the upper transmission channel and/or the heat-conduction oil channel of the lower transmission channel are fixed on the holder, and
the holder is provided with a wheel at the bottom thereof.

9. A method utilizing the apparatus according to claim 1, comprising the following steps:
heat-conduction oil cycling: heating heat-conduction oil in the heat-conduction oil storage container, and driving the heat-conduction oil that has been heated to pass through the heat-conduction oil channel of the upper transmission channel and the heat-conduction oil channel of the lower transmission channel and then flow back to the heat-conduction oil storage container;
molten salt liquid cycling: after setting time for the heat-conduction oil cycling, driving molten salt liquid in the molten salt storage container to pass through the molten salt liquid channel of the upper transmission channel and the molten salt liquid channel of the lower transmission channel and then flow back to the molten salt storage container; and
transmitting tire block in the upper transmission channel by the upper transmission device from the upper transmission channel inlet to the upper transmission channel outlet, and transmitting the tire block in the lower transmission channel by the lower transmission device from the lower transmission channel inlet to the lower transmission channel outlet.

10. The method according to claim 9, wherein the upper transmission channel and the lower transmission channel are both a U-shaped trough with an opening upward,
the molten salt liquid channel of the upper transmission channel and/or the molten salt liquid channel of the lower transmission channel have/has a U-shaped cross-section, and
the heat-conduction oil channel of the upper transmission channel and/or the heat-conduction oil channel of the lower transmission channel have/has a U-shaped cross-section.

11. The method according to claim 9, wherein the top of the box body is provided with an oil-gas outlet and a feeding inlet protruding from the box top, a channel of the feeding inlet is provided with a first valve and a second valve, and the first valve is located above the second valve, the method further comprising the following steps:
closing the second valve and opening the first valve, so as to transmit the tire block into the feeding inlet; and
closing the first valve and opening the second valve, so that the tire block enters into the box body.

12. The method according to claim 11, wherein the apparatus further comprises:
a condensing gas container,
a gas container, and
a refining oil container,
wherein the refining oil container and the condensing gas container are respectively located at a lower position and a higher position,
the condensing gas container comprises a condensing gas container inlet, an uncondensed gas outlet and a refining oil outlet respectively disposed at an upper part, a middle part and a lower part of the condensing gas container,
the gas container comprises a gas container inlet,
the oil-gas outlet is connected to the condensing gas container inlet,
the refining oil outlet is connected to the refining oil container, and
the uncondensed gas outlet is connected to the gas container inlet,
the method further comprising the following step:
pumping gas inside the gas container to the box body.

13. The method according to claim 9, further comprising the following step:
extracting gas inside the box body to the condensing gas container, wherein the inner space of the box body is under a vacuum condition;
and wherein the temperature of molten salt liquid in the molten salt liquid channel of the upper transmission channel and/or the molten salt liquid channel of the lower transmission channel is 200° C. to 400° C., and the temperature of heat-conduction oil in the heat-conduction oil channel of the upper transmission channel and/or the heat-conduction oil channel of the lower transmission channel is 100° C. to 250° C.

14. The method according to claim 10, further comprising the following step:
extracting gas inside the box body to the condensing gas container, wherein the inner space of the box body is under a vacuum condition;
and wherein the temperature of molten salt liquid in the molten salt liquid channel of the upper transmission channel and/or the molten salt liquid channel of the lower transmission channel is 200° C. to 400° C., and the temperature of heat-conduction oil in the heat-conduction oil channel of the upper transmission channel and/or the heat-conduction oil channel of the lower transmission channel is 100° C. to 250° C.

15. The method according to claim 11, further comprising the following step:
extracting gas inside the box body to the condensing gas container, wherein the inner space of the box body is under a vacuum condition;
and wherein the temperature of molten salt liquid in the molten salt liquid channel of the upper transmission channel and/or the molten salt liquid channel of the lower transmission channel is 200° C. to 400° C., and the temperature of heat-conduction oil in the heat-conduction oil channel of the upper transmission channel and/or the heat-conduction oil channel of the lower transmission channel is 100° C. to 250° C.

16. The method according to claim 12, further comprising the following step:
extracting gas inside the box body to the condensing gas container, wherein the inner space of the box body is under a vacuum condition;
and wherein the temperature of molten salt liquid in the molten salt liquid channel of the upper transmission channel and/or the molten salt liquid channel of the lower transmission channel is 200° C. to 400° C., and the temperature of heat-conduction oil in the heat-conduction oil channel of the upper transmission channel and/or the heat-conduction oil channel of the lower transmission channel is 100° C. to 250° C.

* * * * *